Patented June 12, 1945

2,378,359

UNITED STATES PATENT OFFICE 2,378,359

PREPARATION OF FATTY ACIDS

Alfred G. Houpt, Springdale, Conn., assignor to American Cyanamid Company, New York, N. Y., a corporation of Maine No Drawing. Application May 8, 1942, Serial No. 442,181

4 Claims. (Cl. 260—97.5)

This invention relates to the preparation of fatty acids from black liquor soap fatty acid soaps, and recovery of the amyl alcohol in the filter cake.

Heretofore, the attempts to separate the components of black liquor soap or of talloel have included such methods as high vacuum fractional distillation, crystallization, preferential esterification and combinations of these methods. However, these attempts have been generally unsuccessful. Among the reasons to which this lack of success may be attributed were the poor yields, general lack of sharp separation of acids, corrosion of equipment, manipulation difficulties arising from the nature of the materials treated and the high cost of the methods used.

As described in application of Christmann and Houpt, Serial No. 212,516, filed June 8, 1938, Patent No. 2,285,902, of which this is a continuation-in-part, it is possible to separate the fatty acids from the rosin acids of black liquor soap by a process which includes forming a hot, substantially anhydrous solution of the rosin acids with salts of fatty acids, in an organic solvent in which the salts are soluble hot but insoluble at room temperatures, and in which the rosin acids are soluble both hot and at room temperatures, cooling the solution to precipitate the salts of the fatty acids, filtering off the precipitated salts and recovering the rosin acids from the solution and the fatty acids from the salts, if desired.

As more specifically set forth in Serial No. 212,516, the crude black liquor soap which may be used as the starting material is preferably treated for the removal of various impurities such as lignins and sulfur compounds by dissolving and reprecipitating the soaps from an alkaline salt solution in which the lignin and sulfur compounds remain dissolved. The purified black liquor soap may then be acidified with excess sulfuric acid and the fatty material separated as talloel containing rosin acids as well as fatty acids.

The talloel is dissolved in a suitable solvent, such as secondary amyl alcohol. Either before or after solution, the talloel is partly neutralized with sodium hydroxide or the like in an amount sufficient to combine with the fatty acids as soaps while leaving the rosin acid free. The fatty acid soaps are separated from the solvent solution of free rosin acids by dehydrating the mixture, for example, by boiling and refluxing the solvent-water azeotrope over a water trap, until the solution contains less than 1.5% by volume of removable water. Upon cooling the hot, dehydrated mixture, the salts, or soaps, of the fatty acids are precipitated while the rosin acids remain dissolved in the mother liquor.

As an alternative to the foregoing procedure, involving the preparation of talloel by complete acidification of the purified black liquor soap, this soap may be only partly acidified using 50% sulfuric acid or the like in an amount sufficient to liberate the rosin acids while leaving the fatty acids combined as soaps. This partial acidification may be accomplished prior to or after the addition of a suitable organic solvent such as secondary amyl alcohol but in any case the resulting mixture is then dehydrated in the presence of such solvent, by means such as azeotropic distillation, until it contains less than 1.5% by volume of removable water. The resulting hot and substantially dry solution containing both the fat and rosin, along with sufficient alkali to saponify the fatty acids, all dissolved in the organic solvent, may be separated at this point from the undissolved sludge of sodium sulfate and any insoluble non-fatty contaminants such as cellulosic fibers, by known methods, such as decantation or filtration. The fatty acid soaps are separated from the resulting hot organic solvent solution by cooling, whereupon the salts, or soaps, of the fatty acids are precipitated while the rosin acids remain dissolved in the mother liquor, as in the procedure involving the preparation of talloel.

The solution is preferably cooled slowly in a suitable vessel equipped with a very low-speed agitator, such as one of the anchor or gate type, which will scrape the precipitated soap from the cooling surfaces of the container but which will not grind the precipitate. The temperature is allowed to fall uniformly from the dehydrating temperature of about 120° C. to about 20° C. over a period of about 3 to 5 hours. This procedure results in the formation of a coarsely granular precipitate which will filter rapidly.

The cooled batch is then blown through a filter press by gas pressure. It should best not be pumped through because the pump agitation may disperse the soap granules and slow up the filtration. An inert gas, such as nitrogen, should preferably be used in this step as well as in all others throughout the process, since exposure of the constituents of black liquor soap to air or oxygen causes rapid oxidation resulting in darkening of the products. A weight of fresh, dry secondary amyl alcohol equal to the original amyl alcohol charge is forced through the press after the slurry to wash the rosin-containing liquors from the fatty acid soap cake. In a plate and frame press of the "through washing" design, this proportion of wash liquor is sufficient to reduce the rosin acid concentration to about 1 to 2% in the fatty acids prepared from the filter cake. As the cake in the press retains 50 to 60% of its weight of liquor containing, before washing, about 15% of rosin acids, thorough washing is desirable for a good separation of the fatty acid and rosin acid constituents.

For the preparation of free fatty acids from the fatty acid soap filter cake, the cake containing 50–60% of secondary amyl alcohol is charged in a lead-lined still equipped with an agitator and set up for direct steam distillation. A slight excess of 30% $H_2SO_4$ over that indicated by the total alkali determination on a sample of the cake, is added. This batch should be well mixed before distillation is started in order to avoid foaming. Steam is then passed in and the total distillate collected until it no longer has an odor of amyl alcohol. The distillate will consist of two layers of approximately equal volume. The upper layer of amyl alcohol containing about 9% of water is used as part of the charge with the next batch of talloel and caustic. The lower aqueous layer of the distillate contains about 0.2% of amyl alcohol and can be used, along with the water layer trapped off from the reflux drying of the talloel, caustic, and amyl alcohol, for the generation of steam for the steam distillation of amyl alcohol from subsequent batches of fatty acids.

The residue in the still is drawn off and the lower aqueous layer separated from the upper fatty acid layer. The fatty acid layer should be washed with a little water until the washings are no longer acidic to litmus. The layer separation and subsequent washing are facilitated if carried out while the batch is still hot from the steam distillation. The aqueous sodium sulfate layer from the still can be utilized in the Kraft pulp process. The washed, warm, crude fatty acid layer may be centrifuged or filtered with a small portion of a filter aid such as kieselguhr for complete clarification. The product is a pale amber liquid having the characteristics listed in Table I.

TABLE I
*Characteristics of the crude fatty acid*

| | |
|---|---|
| Free fatty acids per cent | 97–98 |
| Free rosin acids do | 1–2 |
| Neutral fat do | 0.5–1 |
| Iodine number | 125–135 |
| Acid number | 195–200 |
| Color | Amber |
| Odor | Slightly woody |

At temperatures below about 25° C. this fatty acid liquid begins to separate a precipitate of palmitic acid crystals and the iodine number of the fluid portion increases. By refrigerating and filtering the whole fatty acid material in steps down to about 0° C. it can be separated into (1) a saturated solid fatty acid fraction consisting mainly of palmitic acid and (2) an unsaturated, liquid fatty acid fraction consisting mainly of linoleic acid.

By vacuum distillation or vacuum steam distillation the crude, amber fatty acid liquid can be converted to nearly colorless refined fatty acid with a yield of about 95%. Such distillation serves to remove iron compounds and traces of water, resins, and oxidized fats. The fatty acid liquid refined by distillation has the characteristics listed in Table II.

TABLE II
*Characteristics of distilled fatty acid*

| | |
|---|---|
| Boiling range at 1 mm. Hg °C | 157–169 |
| Iodine number | 126–129 |
| Acid number | 198–202 |
| Unsaponifiable | Less than 0.2% |
| Color | Very pale yellow |
| Odor | Slight |

This distilled fatty acid separates crystals of palmitic acid below about 25° C. and by a process of refrigeration and filtration as described for the crude fatty acids it may be separated into a solid and a liquid fraction.

By carrying out the described procedure, there is obtained complete and efficient separation and recovery of the constituents of the fatty acid soap cake: (1) free fatty acids, as such; (2) amyl alcohol, as aqueous azeotrope; (3) alkali, as sodium sulfate aqueous solution, by simple operations.

The fatty acids so secured may be used in or for (1) detergent and dispersing agents; (2) flotation reagents; (3) surface coating compositions; (4) hydrogenation to higher titre fats; (5) sulfonation; (6) vacuum distillation and other refining methods; (7) refrigeration for separation of liquid and solid fractions of the fatty acids; and combinations of these applications.

It will be obvious that other alkalis, acids, solvents, and conditions of operation may be used as set forth in greater detail in application Serial No. 212,516 without affecting the preparation of fatty acids or the recovery of the amyl alcohol in the filter cake. Suitable other changes and variations may be made without departing from the spirit and scope of the invention as defined in the appended claims.

I claim:

1. In a process of separating the fatty acid soaps of black liquor soap from the rosin acids by forming a hot, substantially anhydrous solution of fatty acids, rosin acids and an amount of alkali sufficient to neutralize only the fatty acids in an organic solvent in which the alkali soaps of the fatty acids are soluble hot but not cold, and in which the rosin acids are soluble hot and cold, and, after cooling said solution to precipitate the soaps of the fatty acids which are then separated from the mother liquor, the steps which comprise washing the separated soaps with more of the dry organic solvent until the rosin content does not exceed about 2%, adding to the fatty acid soaps still admixed with some organic solvent an amount of mineral acid slightly in excess of that equivalent to the alkali combined with the fatty acid, steam distilling the acidified mixture until substantially all of the organic solvent is removed, and separating the fatty acids from the aqueous liquid in the still residue.

2. In a process of separating the fatty acid soaps of black liquor soap from the rosin acids by forming a hot, substantially anhydrous solution of fatty acids, rosin acids and an amount of alkali sufficient to neutralize only the fatty acids in an organic solvent in which the alkali soaps of the fatty acids are soluble hot but not cold, and in which the rosin acids are soluble hot and cold, and, after cooling said solution to precipitate the soaps of the fatty acids which are then separated from the mother liquor, the steps which comprise washing the separated soaps with more of the dry organic solvent until the rosin content does not exceed about 2%, adding to the fatty acid soaps still admixed with some organic solvent an amount of mineral acid slightly in excess of that equivalent to the alkali combined with the fatty acid, steam distilling the acidified mixture until substantially all of the organic solvent is removed, separating the fatty acids from the aqueous liquid in the still residue, refrigerating the fatty acids in steps to about 0° C. to precipitate separate fractions of saturated and unsaturated fatty acids.

3. The process of claim 1 in which the organic solvent is secondary amyl alcohol.

4. The process of claim 2 in which the organic solvent is secondary amyl alcohol.

ALFRED G. HOUPT.